US006546070B1

(12) United States Patent
Francke (10) Patent No.: US 6,546,070 B1
(45) Date of Patent: Apr. 8, 2003

(54) ADAPTABLE ENERGY-RESOLVED DETECTION OF IONIZING RADIATION

(75) Inventor: Tom Francke, Sollentuna (SE)

(73) Assignee: XCounter AB, Danderyd (SE)

( * ) Notice: Subject to any disclaimer, the term of this patent is extended or adjusted under 35 U.S.C. 154(b) by 253 days.

(21) Appl. No.: 09/708,521

(22) Filed: Nov. 9, 2000

(30) Foreign Application Priority Data

Sep. 20, 2000 (SE) .............................................. 0003356

(51) Int. Cl.$^7$ .............................................. G01T 1/185
(52) U.S. Cl. .......................... 378/51; 378/82; 378/98.8; 250/385.1; 250/374; 250/385.2; 250/370.01
(58) Field of Search ............................. 378/19, 51, 82, 378/98.8; 250/374, 375, 385.1, 385.2, 370.01, 370.05

(56) References Cited

U.S. PATENT DOCUMENTS

| 4,247,774 | A |   | 1/1981 | Brooks ........................ 250/367 |
| 4,376,892 | A | * | 3/1983 | Charpak et al. ............. 250/372 |
| 4,511,799 | A |   | 4/1985 | Bjorkholm ................... 250/367 |
| 4,535,245 | A |   | 8/1985 | Zonneveld et al. .......... 250/385 |
| 5,025,162 | A | * | 6/1991 | Charpak ..................... 250/385.1 |
| 5,032,729 | A | * | 7/1991 | Charpak ..................... 250/385.1 |
| 5,880,490 | A |   | 3/1999 | Antich et al. ................ 257/186 |
| 6,037,595 | A |   | 3/2000 | Lingren .................... 250/370.01 |
| 6,337,482 | B1 | * | 1/2002 | Francke ..................... 250/385.1 |
| 6,385,282 | B1 | * | 5/2002 | Francke et al. ................ 378/51 |
| 6,389,103 | B2 | * | 5/2002 | Francke et al. ................ 378/98 |
| 6,414,317 | B1 | * | 7/2002 | Francke et al. ........... 250/385.1 |
| 2002/0003860 | A1 | * | 1/2002 | Francke et al. ............ 378/98.8 |
| 2002/0074505 | A1 | * | 6/2002 | Francke ....................... 250/389 |

FOREIGN PATENT DOCUMENTS

WO          9923859          5/1999

OTHER PUBLICATIONS

Abstract of JP 1313789 A, Dec. 19, 1989.

* cited by examiner

Primary Examiner—Drew A. Dunn
(74) Attorney, Agent, or Firm—Birch, Stewart, Kolasch & Birch, LLP (57) ABSTRACT

A detector for detection of ionizing radiation comprises a first cathode and a first anode between which a first voltage is applicable; an ionizable gas arranged at least partly between the first cathode and the first anode; a radiation entrance arranged such that ionizing radiation can enter and ionize the ionizable gas; and a read-out arrangement. The detector further comprises a second cathode and a second anode between which a second voltage is applicable; and a solid state ionizable material arranged between the second cathode and the second anode such that part of the radiation entered into the ionizable gas can propagate through the gas, enter the solid state material and ionize it; wherein the read-out arrangement is arranged for detection of the electrons and/or holes drifted towards the second anode and/or cathode, respectively, separately of detection of the electrons drifted towards the first anode.

36 Claims, 4 Drawing Sheets

ADAPTABLE ENERGY-RESOLVED DETECTION OF IONIZING RADIATION

BACKGROUND OF THE INVENTION

1. Field of the Invention

The present invention generally relates to detection of ionizing radiation, and particularly to the detection of X-rays.

More specifically, the invention relates to an apparatus and method for detection of ionizing radiation, and to a device and method for planar beam radiography.

2. Background Information

Gaseous detectors, in general, are very attractive at photon lower energies since they are cheap to manufacture compared to solid state detectors, and since they can employ gas multiplication to strongly amplify the signal amplitudes. However, at higher energies the gaseous detectors are less attractive as the stopping power of the gas decreases rapidly with increased photon energy. This results in a heavily deteriorated spatial resolution due to extended tracks of so-called long-range electrons, which are created as a result of the X-ray absorption.

An improved spatial resolution is achieved by a gaseous detector for use in planar beam radiography, in which electrons released by interactions between photons and gas atoms can be extracted in a direction essentially perpendicular to the incident radiation. A detector of such a kind is described in our copending international application WO99/23859 entitled A method and a device for planar beam radiography and a radiation detector and filed on Oct. 19, 1998.

When designing a detector for photons of lower energies and using X-rays irradiation of an energy range that includes both lower and higher energies, the higher energy photons will only to a lesser degree be absorbed in the detector due to the finite length of the detector.

In some situations, however, it is desirable to also detect high-energy photons as these can carry information that is distinct from that of lower energy photons. For instance, in the field of radiology the absorption coefficients for bone and tissue, respectively, vary quite differently with photon energy.

SUMMARY OF THE INVENTION

Accordingly, the present invention provides a detector for detection of ionizing radiation, which employs avalanche amplification, and can operate in a wider energy range, particularly also at higher energies, of incoming radiation than prior art detectors.

The invention additionally provides a detector that has improved spatial and energy resolution.

The present invention provides a detector for detection of ionizing radiation, which is effective, fast, accurate, reliable, easy to install and use, and of low cost.

The invention provides a detector for detection of ionizing radiation, which is sensitive and can thus operate at very low X-ray fluxes.

The invention provides a detector for detection of ionizing radiation, which can detect a major portion of the incoming radiation.

The invention provides a device for planar beam radiography, e.g. slit or scan radiography, which comprises a detector for detection of ionizing radiation.

The invention provides a device, which can be operated in a manner such that an object to be imaged only needs to be irradiated with a low dose of X-ray photons, while an image of high quality can be obtained.

The invention provides a device, in which image noise caused by radiation scattered in an object to be examined and/or by the spread of X-ray energy spectrum is reduced.

The present invention provides methods for detection of ionizing radiation and for planar beam radiography, respectively, which make use of a detector for detection of ionizing radiation and a device for planar beam radiography, respectively, which fulfill the above said objects.

The present invention is attained by detectors, devices, and methods as claimed in the appended claims.

Further characteristics of the invention and advantages thereof will be evident from the following detailed description of preferred embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–7, which are given by way of illustration only, and thus are not limitative of the invention.

DETAILED DESCRIPTION OF PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
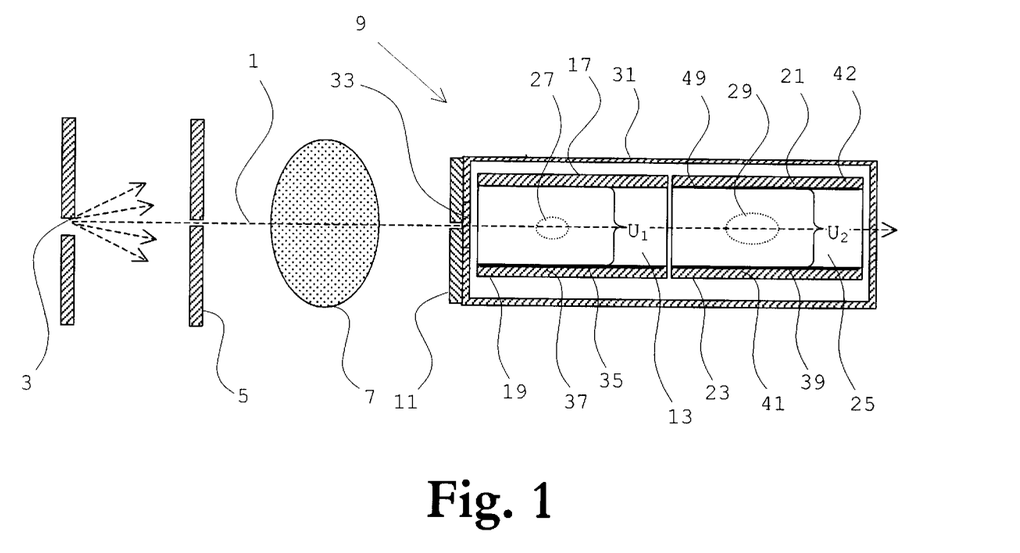
FIG. 1 illustrates schematically, in a cross sectional view, a device for planar beam radiography, according to a first embodiment of the present invention.

FIG. 1 is a sectional view in a plane orthogonal to the plane of a planar X-ray beam 1 of a device for planar beam radiography, according to a first embodiment of the present invention. The device includes an X-ray source 3, which together with a first thin collimator window 5 produces the planar fan-shaped X-ray beam 1, for irradiation of an object 7 to be imaged.

The beam transmitted through the object 7 enters a detector 9. Optionally a thin slit or second collimator window 11, which is aligned with the X-ray beam, forms the entrance for the X-ray beam 1 to the detector 9.

The detector 9 is oriented such that the X-ray photons can enter sideways between a cathode 17 and an anode 19, between which a space 13 capable of being filled with an ionizable gas or gas mixture is arranged. A voltage $U_1$ can be applied between cathode 17 and anode 19 for drift of electrons and ions in space 13. Cathode 17 and anode 19 are preferably substantially parallel with each other.

The ionizable gas or gas mixture (for example 90% krypton and 10% carbon dioxide or for example 80% xenon and 20% carbon dioxide) may be under pressure, preferably in a range 1–20 atm. Therefore, the detector includes a gas tight housing 31 with a slit entrance window 33, through which the X-ray beam 1 can enter the detector. In FIG. 1 the casing 31 encloses major parts of detector 9. It shall, however, be appreciated that casing 31 may be arranged in other manners as long as the space between the electrodes may be enclosed.

Further, a second cathode 21 and a second anode 23 are arranged in detector 9, between which cathode 21 and anode 23 a solid state wafer or slab 25 of an ionizable semiconducting material is arranged. The second cathode 21, the second anode 23, and the solid state wafer 25 are located within detector 9 such that part of radiation 1 entered into space 13 through radiation entrance 33 will propagate through space 13, and enter solid state slab 25. The interaction of radiation 1 and the material of slab 25 will result in the creation of electrons and holes, which may be drifted towards the anode 23 and cathode 21, respectively, by means of a second voltage $U_2$ applied between cathode 21 and anode 23.

Cathode 21 and anode 23 can be arranged such that the part of radiation beam 1, which enters solid state slab 25, propagates between and substantially in parallel with cathode 21 and anode 23.

Alternatively, cathode 21 and anode 23 are arranged such that part of radiation beam 1 can enter solid state slab 25 through cathode 21 and substantially perpendicular to cathode 21 and anode 23.

The solid states wafer 25 can be made of silicon but preferably is of a higher Z semiconductor material. The waver can consist of high-resistivity CdZnTe, which can operate at room temperature and can be fabricated into detectors, or other semiconductor materials that have high-resistivity and that can be fabricated into detectors. Of course, those skilled in the art will recognize that virtually any semiconductor material may be used in the invention.

Further aspects of the solid state section of detector 9, i.e. of solid state wafer 25 and of cathode 21 and anode 23 are found in U.S. Pat. No. 6,037,595 issued to Lingren, in U.S. Pat. No. 5,880,490 issued to Antich et al., and in references therein, said documents being hereby incorporated by reference.

Furthermore, detector 9 comprises a read-out arrangement for separate detection of the electrons drifted towards anode 19 and 23, respectively, as well as holes drifted towards the cathode 21. The read-out arrangement may be constituted of the anodes 19 and 23 themselves as in FIG. 1, or a separate read-out arrangement may be arranged adjacent anodes 19 and 23, adjacent cathodes 17, 21, or elsewhere. Such detector 9 has thus a first gas detector section and a second solid state detector section, said sections being capable of separate detection of incident X-rays.

The X-ray source 3, the first thin collimator window 5, the optional collimator window 11 and the detector 9 are connected and fixed in relation to each other by a suitable means for example a frame or support (not shown in FIG. 1).

Figure 2:
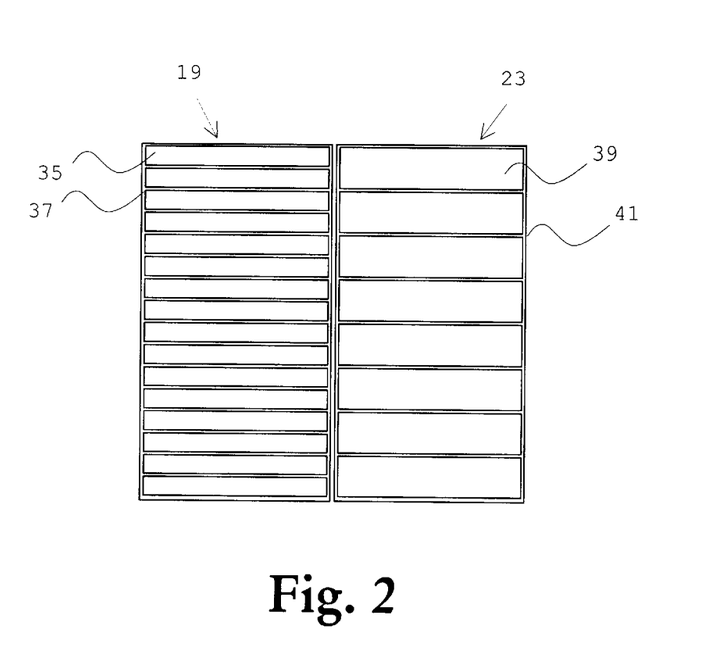
FIG. 2 is a schematic top view of a first and a second anode, respectively, as being comprised in the detector of FIG. 1.

Referring now to FIG. 2, a possible configuration of anodes 19 and 23 (and thus configuration of the read-out arrangement) is shown. Anode 19 is formed by an array of conductive read-out strips 35 arranged electrically insulated from each other on a dielectric layer or substrate 37, and anode 23 is formed by another array of conductive read-out strips 39 arranged electrically insulated from each other on another dielectric layer 41. Similarly, the cathode 21 is formed by another array of conductive read-out strips 49 arranged electrically insulated from each other on another dielectric layer 42. Dielectric layers 37 and 41 may alternatively be comprised of a single dielectric layer. The strips may be formed by photolithographic methods or electroforming, etc. The readout elements 39 and 49 can alternatively be situated on the semiconductor material 25 eliminating the need of substrates 41 and 42.

Strips 35 are placed side by side, strips 39 are placed side by side, and strips 49 are placed side by side, wherein strips 35, 39 and 49 extend essentially in directions parallel to the direction of incident X-ray photons of beam 1, originating from source 3, at each location. Thus, given a divergent beam 1, read-out strips 35, 39, and 49 are arranged in a fan-like configuration and not parallelly as illustrated in FIG. 2. Such fan-like configuration provides for an increased spatial resolution and for compensation for parallax errors in any detected images.

The length and width of strips 35, 39 and 49 are adjusted to the specific detector in order to obtain the desired (optimal) spatial resolution.

Each of the strips 35, 39 and 49 is preferably connected to processing electronics (not shown in FIG. 2) by means of a respective separate signal conductor, whereby the signals from each strip can be processed separately. As the read-out strips 35 and 39 also constitutes the anodes, the signal conductors also connects the respective strip to the high voltage DC power supply, with suitable couplings for separation.

Such design of the read-out arrangement provides for capability of separate detection of electrons derivable mainly from ionization by transversely separated portions of planar radiation beam 1 either by strips 35 or by strips 39. In such manner one-dimensional imaging is enabled.

In the case the read-out arrangement is a separate arrangement, anodes 35 and 39 can be formed as a unitary electrodes without strips.

In an alternative configuration of anodes/read-out arrangement (not illustrated), the strips are further divided into segments in the direction of the incident X-rays, the segments being electrically insulated from each other. A small spacing extending perpendicular to the incident X-rays can be provided between each segment of respective strip. Each segment is connected to the processing electronics by means of a separate signal conductor, where the signals from each segment preferably are processed separately. This read-out arrangement can be used when further energy-resolved detection of the X-rays is required.

Furthermore, the voltages $U_1$ and $U_2$ (i.e. the electrical fields created thereby) can be kept high enough, during operation, to cause electron avalanche amplification within space 13 and possibly but not necessarily in solid state slab 25.

Alternatively, other avalanche amplification arrangements or field concentration means may be provided such that electrons (and holes) freed in space 13 and possibly in solid state slab 25, respectively, can be amplified before detection.

Possible avalanche amplification arrangements for the gaseous detector section are further described in our co-pending Swedish patent application No. 9901325-2 entitled Radiation detector, an apparatus for use in planar radiography and a method for detecting ionizing radiation and filed on Apr. 14, 1999, which application hereby is incorporated by reference. Possible avalanche amplification arrangements for the solid state detector section are further described in above said U.S. patents, and in references therein.

In operation, the incident X-rays 1 enter the detector through the optional thin slit or collimator window 11, if present, and between cathode 17 and anode 19, preferably in a center plane between them as indicated in FIG. 1. The incident X-rays 1 then travel through the gas volume in a direction preferably substantially parallel with electrodes 17 and 19 and get absorbed, thus ionizing gas molecules in space 13. Some of the X-rays 1 will pass through space 13, enter solid state slab 25 and ionize the ionizable semiconducting material therein.

Thus some X-ray are absorbed in region 27 in space 13 and some X-rays may be absorbed in region 29 within the semiconductor 25. X-rays absorbed in space 13 will cause electrons to be released, which will drift towards anode 19 due to voltage $U_1$ applied between cathode 17 and anode 19. Correspondingly, X-rays absorbed in solid state wafer 25 will cause electrons and holes to be freed, which will drift towards anode 23 and cathode 21, respectively, due to voltage $U_1$ applied between cathode 21 and anode 23. If the voltages are kept high enough and/or if field concentration means are provided (as discussed above) the freed electrons are avalanche amplified during their travel towards the anode. The electrons induce charges in the strips of the read-out arrangement, i.e. in anode strips 35 and 39 in the illustrated detector of FIGS. 1 and 2, which are detected. If no avalanche amplification takes place the major part of the signal is due to collection of the liberated charges.

Each incident X-ray photon causes generally one induced pulse in one (or more) anode strip. The pulses are processed in the processing electronics, which eventually shapes the pulses, and integrates or counts the pulses from each strip representing one picture element. The pulses can also be processed so as to provide an energy measure for each pixel.

The depth within space 13 and/or solid state wafer 25 where an interaction between an X-ray and the ionizable material takes part is governed statistically by the absorption rate of the X-rays in the material used. High-energy X-rays will generally have a larger penetration depth than X-rays of lower energy.

As the X-rays enter the detector preferably in a direction parallel to cathode plate 17 and anode plate 19, the detector can easily be made with an interaction path long enough to allow a major fraction of the incident X-ray photons to interact and be detected.

The detector in accordance with the present invention is particularly useful when broadband X-ray radiation is used. In such manner detector 9 may be adapted such that a substantial portion of the lower energy radiation of the broadband radiation is absorbed by the ionizable gas and a substantial portion of the higher energy radiation of the broadband radiation is absorbed by the ionizable semiconducting material. In such manner the detector provides for energy-resolved detection of the radiation.

Interaction of broadband X-ray radiation with material (e.g., the gas in space 13) results in the release of photo-electrons of a large range of kinetic energies. Electrons of higher kinetic energies (up to 100 keV) are denoted long-range electron is and will travel a relatively long path (typically 1–20 mm at 1 atm.) before they become retarded and stopped (loses their kinetic energy) in the material, whereas electrons of lower kinetic energy are denoted short-range electrons.

When the ionized material relaxes, typically an Auger electron and/or a fluorescent (X-ray) photon are released. An Auger electron is a short-range electron with low kinetic energy (typically 1–5 keV), which travel a relatively short path (0.01–0.1 mm at 1 atm.) before it becomes stopped in the gas. Therefore, during one single interaction of an X-ray photon with a gas atom, e.g. Kr or Xe, several electrons will, in many cases, be released simultaneously; both long-range and short-range electrons. Further, fluorescent photons may be emitted during the interaction.

Both long-range and short-range electrons produce electron tracks of secondary ionized electrons produced by the electrons during the travel in the gas. When an electron has high kinetic energy (e.g. 20–30 keV), the number of released electrons (secondary ionized electrons) is low per path unit. For electrons having low kinetic energy (typically 1–4 keV) the number of released electrons (secondary ionized electrons) per path unit is higher.

As the typical track length of a long-range electron is about 1–20 mm at atmospheric pressure, such measure is a physical limit of the spatial resolution. The fluorescent photons emitted can also create ionization, as mentioned above. This ionization takes place far away from the primary interaction with a typical attenuation length of 1.5–250 mm at atmospheric pressure. This ionization also deteriorates the spatial resolution and creates background noise.

Consequently, the distance between cathode 17 and anode 19 is preferably chosen such that detection of lower energy photons of high spatial resolution is enabled. Thus, the distance shall preferably be shorter than the attenuation length of the fluorescent (X-ray) photons. This results in that a large number of fluorescent photons will not cause ionization in space 13.

A further improvement of the spatial resolution is achieved if the detector has a distance between cathode 17 and anode 19, which is shorter than the length of the electron tracks (i.e. the interaction length) of long-range electrons. This results in that an even larger number of fluorescent photons and a large number of long-range electrons will not undergo full energy loss in the first space section.

Still a further improvement of the spatial resolution is achieved if the detector has a distance between cathode 17 and anode 19, which is less than, or essentially equal to, a few times the length of the electron tracks (i.e. interaction length) of short-range electrons, e.g. 1–5 times the length of the electron tracks of the short-range electrons. This results in that a larger number of fluorescent photons and a larger number of long-range electrons will not undergo full energy loss in space 13. If the distance is smaller than the length of the electron tracks of the short-range electrons, the efficiency will go down since also short-range electrons will reach the electrode plates before complete ionization.

By such geometrical discrimination of long-range electrons and fluorescent photons a larger amount of the detected electrons are caused by short-range electrons, which improves the spatial resolution since the long-range electrons and fluorescent photons may cause release of electrons far from the interaction position of the incident X-ray.

The distance between cathode 21 and anode 23 (i.e. the thickness of solid state wafer 25) is preferably chosen such that detection of higher energy photons is enabled. Thus, the distance between cathode 21 and anode 23 shall preferably be long enough to allow primary long-range electrons to be retarded and to ionize the semiconducting material of the solid state wafer, thus releasing shorter-range electrons. The efficiency of detecting higher energy photons is thus improved to the cost of a deteriorated spatial resolution.

Preferably though, the distance between cathode 21 and anode 23 is shorter than the attenuation length of fluorescent (X-ray) photons. This results in that a great number of fluorescent photons will not cause ionization in the semiconducting material.

A further improvement of the spatial resolution is achieved if the detector has a distance between cathode 21 and anode 23, which is essentially a few times the length of the electron tracks (i.e. interaction length) of long-range electrons, e.g. 1–5 times the length of the electron tracks of the long-range electrons.

Certainly, the distances between cathode 17 and anode 19 and between cathode 21 and anode 23, respectively, the lengths of space 13 and of solid state wafer 25 in a direction parallel with the incident radiation, the composition of the gas mixture in space 13, the pressure thereof, and the material of solid state wafer 25, are designed for each particular application and for each particular radiation spectrum used in order to achieve desired detection efficiency, and required spatial and energy resolution. However, thicknesses in the range of 0.1–5 mm, a gas space length in the range of 10–200 mm, and a solid state wafer length in the range of 0.1–10 mm may typically be employed.

Further discussions of detector thicknesses and electrode gaps are found in applicant's co-pending Swedish patent applications No. 9901326-0 entitled A method for detecting ionizing radiation, a radiation detector and an apparatus for use in planar beam radiography and filed on Apr. 14, 1999 and No. 0000388-9 entitled Detector and method for detection of ionizing radiation and filed on Feb. 8, 2000. These applications are hereby incorporated by reference.

Figure 3:
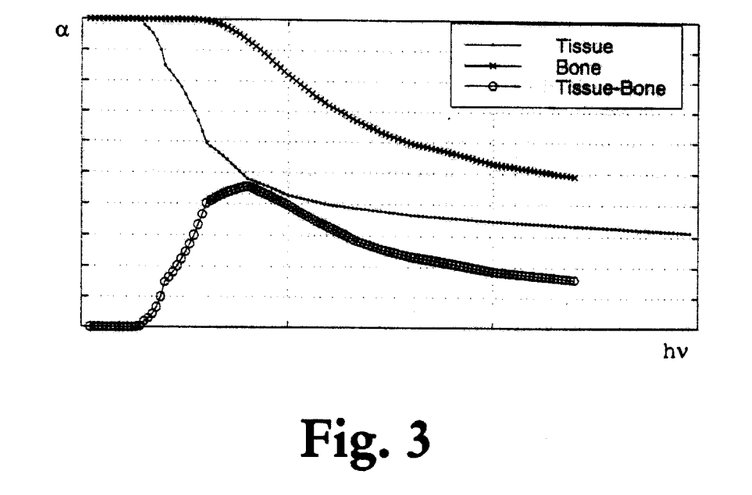
FIG. 3 is a diagram showing the absorption coefficient of X-rays due to.absorption in tissue and bone, respectively, of human body as a function of X-ray energy.

With reference now to FIG. 3 a particular application of the present invention for measuring bone mineral density of humans is to be described. FIG. 3 is a diagram showing the absorption coefficient α of X-rays due to absorption in tissue, and in bone, respectively, of human body as a function of X-ray energy. In the diagram, the absorption coefficient varies from 1 to roughly 0.4 as the X-ray photon energy varies from 0 to 150 keV. Shown is also the differential absorption coefficient (indicated Tissue-Bone), which is an indication of the absorption selectivity between tissue and bone, as a function of the photon energy.

Normally the bone is surrounded by an unknown amount of tissue. One commonly used method to estimate the amount of bone is to detect transmitted X-rays at two different X-ray energies. One exposure is made at X-ray energies where bone and tissue absorb X-rays very differently; typically at 40 keV where the differential absorption coefficient has a maximum, see FIG. 4. Another exposure is made at energies where bone and tissue absorb X-rays in a similar way; typically at energies above 100 keV, see FIG. 3 again. From these two measurements the amount of bone is estimated. However, this requires that the detector is capable of detecting low energy (around 40 keV) X-rays as well as high energy X-rays (>100 keV), which is often a problem. Furthermore, to obtain beams with a narrow energy distribution at low energy, the incoming X-ray flux, which has a broad spectrum, needs to be heavily filtered, putting a large load on the X-ray tube. The two separate exposures, taken at different times, also give rise to problems due to movements of the object between the two exposures.

The present invention describes a combined gaseous-solid state detector that can measure X-rays over a wide energy range. Low energy X-rays are preferably detected in the first gaseous section of the detector due to their short absorption length. High energy X-rays mainly traverse the first section of the detector and are detected in the second solid state section. The invention allows the same detector to be used to efficiently detect X-rays at rather different energies with the same detector, using the commonly used double exposure method.

Alternatively, the two measurements can be made simultaneously using a broad X-ray spectrum of the incident X-rays. This second alternative requires less filtering of the X-rays and put less load on the X-ray tube. Furthermore, by simultaneously detecting the two energy intervals problems of movements between exposures are reduced.

The device of FIG. 1 can be moved as a unit to scan an object, which is to be examined. In a single detector system the scanning can be done by a pivoting movement, rotating the unit around an axis through for example the X-ray source 3 or the detector 9. The location of the axis depends on the application or use of the device, and possibly the axis can also run through the object 7, in some applications. It can also be done in a translative movement where the detector and the collimator are moved, or the object to be imaged is moved.

In a multi-line configuration, where a number of detectors are stacked, the scanning can be performed in various ways. In many cases it can be advantageous if the device for radiography is fixed and the object to be imaged is moved.

Figure 4:
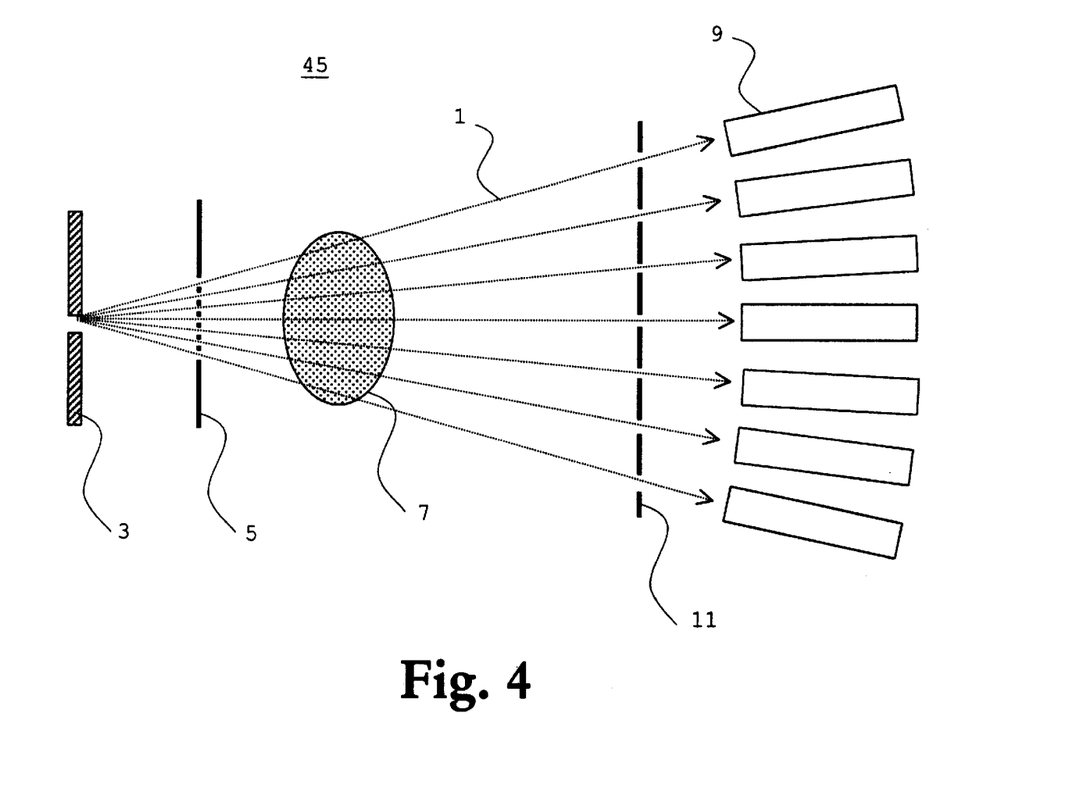
FIG. 4 is a schematic top view of a device having a plurality of the detector of FIG. 1 in a stacked configuration.

FIG. 4 shows schematically such a multi-line configuration 91 according to an embodiment of the present invention having a plurality of the inventive detectors 9 stacked, side-by-side of each other. By this embodiment multiline scan can be achieved, which reduces the overall scanning distance, as well as the scanning time. The device of this embodiment includes an X-ray source 3, which together with a number of collimator windows 5 produce a number of planar fan-shaped X-ray beams 1, for irradiation of the object 7 to be imaged. The beams transmitted through the object 7 optionally enter the individual stacked detectors 9 through a number of second collimator windows 11, which are aligned with the X-ray beams. The first collimator windows 5 are arranged in a first rigid structure (not shown in FIG. 7), and the optional second collimator windows 11 are arranged in a second rigid structure (not shown in FIG. 7) attached to the detectors 9, or arranged separately on the detectors.

The X-ray source 3, the first rigid structure, and the possible second rigid structure including collimator windows 11, respectively, and the stacked detectors 9, which are fixed to each other, are connected and fixed in relation to each other by a certain means, e.g., a frame or support (not shown in FIG. 4). The so formed device for radiography can be moved as a unit to scan an object, which is to be examined. In this multiline configuration, the scanning can be done in a transverse movement, perpendicular to the X-ray beam, as mentioned above. The device for radiography can be fixed and the object to be imaged can be moved. Alternatively, the collimator and the detector can be moved synchronously by a commonly controlled motor.

Using a stacked configuration, compared to large two-dimensional detectors, reduces background noise caused by X-ray photons scattered in the object 7. These scattered X-ray photons traveling in directions not parallel to the incident X-ray beam could cause "false" signals or avalanches in one of the other detectors 9 in the stack, if passing through anode and cathode plates and entering such a space. This reduction is achieved by significant absorption of (scattered) X-ray photons in the material of the anode and the cathode plates, or the collimator 11. This background noise can be further reduced by providing thin absorber plates (not illustrated) between the stacked detectors. These absorber plates or sheets can be made of a high atomic number material, for example tungsten.

Figure 5:
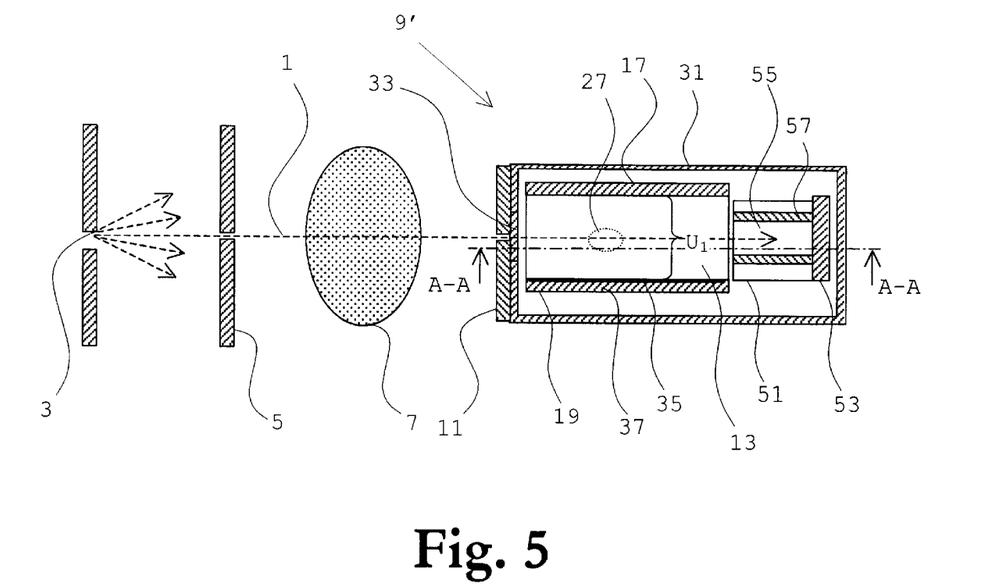
FIG. 5 illustrates schematically, in a cross sectional view, a device for planar beam radiography, according to a second embodiment of the present invention.
Figure 6:
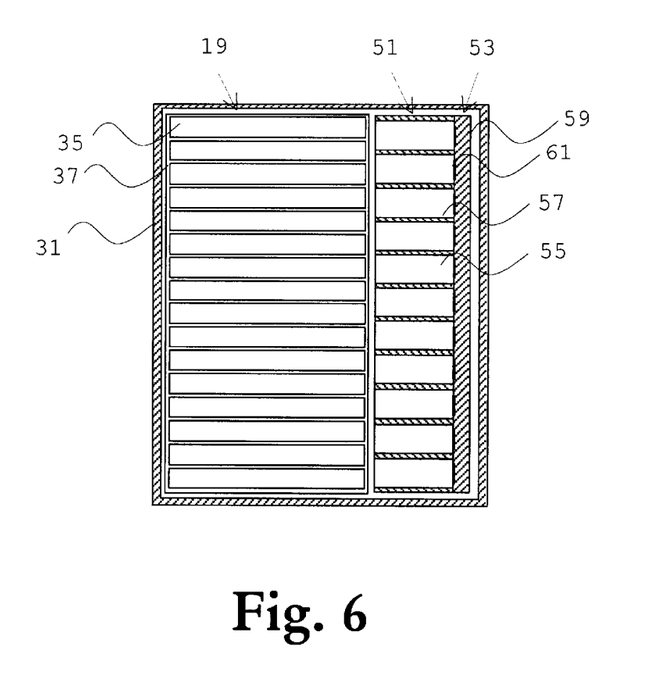
FIG. 6 is a schematic cross sectional view of a detector comprised in the device of FIG. 5, as being taken along line A—A therein.

With reference now to FIGS. 5 and 6, which illustrate schematically, in cross sectional views, a device for planar beam radiography and a detector 9' thereof, respectively, a second illustrated embodiment of the present invention will be described. In FIGS. 5 and 6 details and components, which are identical with those of the FIGS. 1 and 2 embodiment, have identical reference numerals, and will not be further described.

The detector 9' comprises like detector 9 of FIGS. 1 and 2 the gaseous detector section including cathode 17, anode 19, and space 13 capable of being filled with an ionizable gas.

However, instead of comprising a solid state detector section, detector 9' comprises a scintillator based detector section 51 including a scintillating material 55 arranged such that part of radiation beam 1 entered into space 13 through radiation entrance 33 can propagate through space 13 and enter scintillating material 55, wherein the radiation is converted into light therein. Further, scintillator section 51 comprises a light detecting arrangement 53 for detection of the light created. Preferably, scintillating material 55 is arranged in a plurality of elongated scintillator elements aligned in an array. Scintillator section 51 may further comprise interstitial barriers 57 disposed between the scintillator elements 55 so as to separate each scintillator element from adjoining elements. Interstitial barriers 57 are comprised of a material that absorbs the radiation entered into the scintillating material, as well as scintillation light emitted in the scintillator 55.

The plurality of elongated scintillator elements 55 are arranged such that radiation beam 1 enters the plurality of elongated scintillator elements 55 at a respective first end thereof, whereas light detecting arrangement 53 is arranged at a respective second end thereof. Preferably light emitted in the scintillating material is detected in a direction parallel with the incident radiation beam. However, detection may be arranged at right angle thereto, or at virtually any angle since the light is emitted is tropically in the scintillating material.

If a planar radiation beam is entered into detector 9', each detector section provides for one-dimensional imaging.

As in the previous embodiment, if radiation having a broadband energy spectrum is entered into the detector, a substantial portion of the lower energy radiation of the broadband radiation is absorbed by the ionizable gas in space 13 and a substantial portion of the higher energy radiation of the broadband radiation is converted into light in scintillating material 55. In such manner detector 9' provides for adapted energy-resolved detection of the radiation.

Further, detector 9' may comprise amplifiers for amplifying the electrons released in space 13 and the light emitted in the scintillating material. Alternatively or additionally, any other suitable amplification means may be provided.

Figure 7:
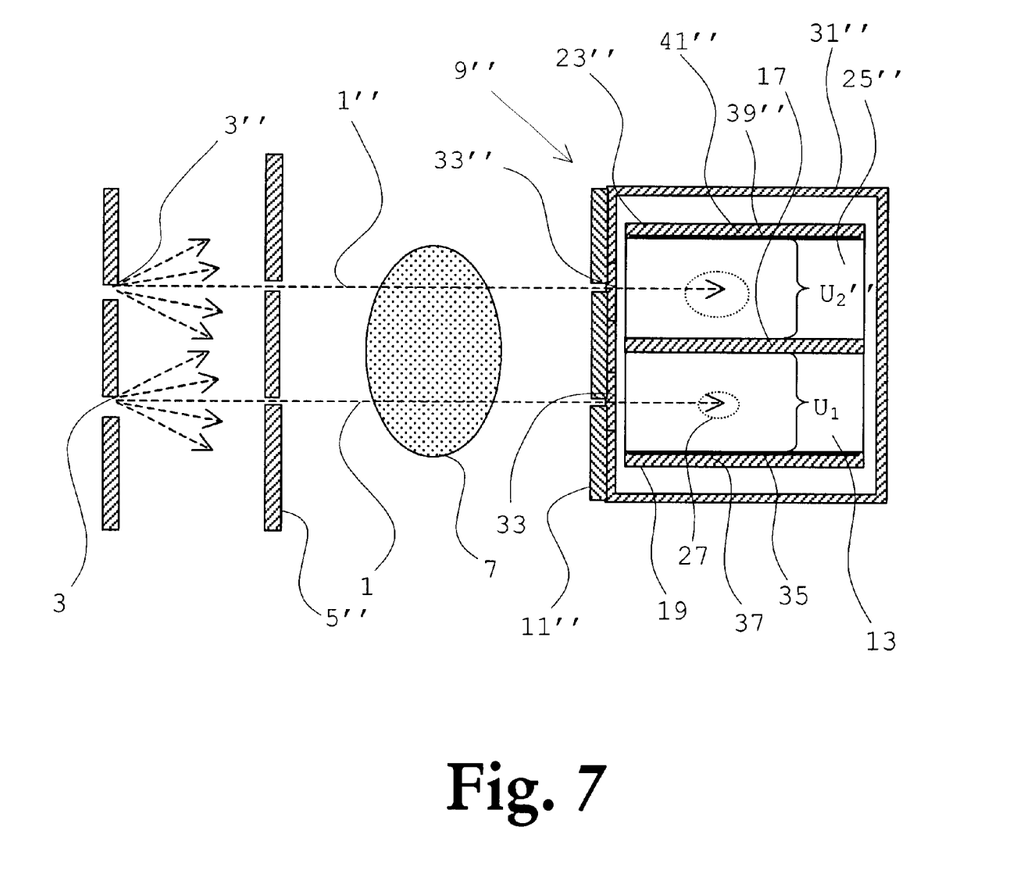
FIG. 7 illustrates schematically, in a cross sectional view, a device for planar beam radiography, according to a third embodiment of the present invention.

With reference now to FIG. 7, which illustrates schematically, in a cross sectional view, a device for planar beam radiography, a third illustrated embodiment of the present invention will be described. In FIG. 7 details and components, which are identical with those of the previous embodiments, have identical reference numerals, and will not be further described.

The FIG. 7 device comprises a detector 9", which like detector 9 of FIGS. 1 and 2 comprises the gaseous detector section including cathode 17, anode 19, and space 13 capable of being filled with an ionizable gas. Likewise, detector 9" comprises a second solid state section, however, this section being arranged differently.

Further, this embodiment comprises a second X-ray source 3", a thin collimator window 5" for producing two planar fan-shaped X-ray beams 1, 1" for irradiation of an object 7 to be imaged.

The beams transmitted through the object 7 enter detector 9" through entrance windows 33 and 33". Optionally a sheet 11" having two apertures aligned with the X-ray beams is arranged in front of the entrance windows 33 and 33". The detector 9", is oriented such that beam 1 enters the gaseous detector section, i.e., into space 13 between cathode 17 and anode 19, and beam 1" enters the second solid state detector section of detector 9". Space 13 is enclosed by casing 31" and entrance windows 33 and 33" and is filled with an ionizable gas.

The second detector section can use the same cathode 17 as is comprised in the gaseous detector section, but alternatively a separate cathode (not illustrated) is provided. Further the second detector section comprises an anode 23" substantially in parallel with cathode 17, and a solid state slab 25" of an ionizable semiconducting material arranged between cathode 17 and anode 23". Solid state slab 25" is of a suitable material and is ionized by radiation beam 1". Further, a voltage $U_2$" can be applied between cathode 17 and anode 23" for drifting electrons created during ionization of the semiconducting material towards anode 19".

Anode 23" may be configured such as anode 19 of detector 9 (FIGS. 1 and 2), i.e. with conductive read-out strips 39" arranged electrically insulated from each other on a dielectric layer or substrate 41", to also constitute read-out arrangement. The strips are preferably arranged side by side and extend essentially in directions parallel to the direction of incident X-ray photons of beam 1". Alternatively, a separate read-out arrangement (not illustrated) may be provided.

In both instances the read-out arrangement is arranged for detection of electrons drifted towards anodes 19 and 23" separately.

As in previous embodiments the gaseous detector section can be adapted for detection of lower energy radiation whereas the solid state detector section is adapted for detection of higher energy radiation.

Alternatively, instead of using two sources of radiation, one extended source of radiation may be used, which is divided into two beams by means of apertures or the like.

Yet alternatively, instead of using two radiation beams and possibly simultaneous detection in the two detector sections, the detector may be movable in a direction vertical to a single, preferably broadband, radiation beam and the detector sections with their respective entrance windows are, one after the other, aligned with the radiation beam so as to allow sequential detection by the detector sections.

It shall further be appreciated that the detector may be provided with suitable filters in front of the respective detector section. Particularly, in such instance a filter, which transmits only higher energy radiation, is arranged in front of the solid state detector section and a filter, which transmits only lower energy radiation, is arranged in front of the gaseous detector section. The previous embodiments may provide such a filter in front of the solid state and the scintillator based detector sections.

Further, yet another embodiment of the present invention (not illustrated) uses the geometrical concept of the FIG. 7 embodiment, but comprises a scintillator based detector section as a replacement for the solid state detector section.

It shall be appreciated that any of the above described embodiments and alternatives may be combined in yet other configurations.

It shall further be appreciated that the electrodes of the detector sections in the various embodiments may be non-parallel with each other. The cathode and anode can be arranged with an angle α in respect to each other, whereby the electrode ends facing the radiation source are located closer to each other than the far ends thereof. In the case of a solid state based detector section, the ionizable solid state wafer is preferably then thinner in the end facing the radiation source. In this respect further reference is made to our co-pending Swedish patent application No. 9901324-5 entitled Radiation detector and an apparatus for use in planar radiography and filed on Apr. 14, 1999, which application hereby is incorporated by reference.

Such variations are not to be regarded as a departure from the scope of the invention. All such modifications as would be obvious to one skilled in the art are intended to be included within the scope of the appended claims.

What is claimed is:

1. A detector for detection of ionizing radiation comprising:
   a first cathode and a first anode between which a first voltage is applicable;
   a space capable of being filled with an ionizable gas and arranged at least partly between said first cathode and said first anode;
   a radiation entrance arranged such that ionizing radiation can enter said space between said first cathode and said first anode, for ionizing the ionizable gas;
   a read-out arrangement; wherein said first voltage is applicable for drifting electrons created during ionization of said ionizable gas towards the first anode, and said read-out arrangement is arranged for detection of the electrons drifted towards the first anode;
   a second cathode and a second anode between which a second voltage is applicable; and
   a solid state slab of an ionizable semiconducting material and arranged between said second cathode and said second anode such that part of said radiation entered into said space through said radiation entrance can propagate through said space, enter said solid state slab and ionize the ionizable semiconducting material; wherein said second voltage is applicable for drifting electrons and holes created during ionization of said semiconducting material towards the second anode and cathode, respectively, and said read-out arrangement is further arranged for detection of the electrons and/or holes drifted towards the second anode and/or cathode, respectively, separately of the detection of the electrons drifted towards the first anode.

2. The detector as claimed in claim 1, wherein the radiation entrance is arranged such that radiation having a broadband energy spectrum can enter the space, and wherein the detector further is arranged such that a substantial portion of the lower energy radiation of said broadband radiation is absorbed by the ionizable gas and a substantial portion of the higher energy radiation of said broadband radiation is absorbed by the ionizable semiconducting material, whereby the read-out element arrangement is arranged for energy-resolved detection of the radiation.

3. The detector as claimed in claim 1, wherein the distance between the first cathode and the first anode is arranged so as to be shorter than the attenuation length of fluorescent photons emitted in the ionizable gas subsequent to ionization by said radiation.

4. The detector as claimed in claim 1, wherein the radiation entrance is arranged such that radiation having a broadband energy spectrum can enter the space, whereby short-range electrons are released through ionization by lower energy radiation of said broadband radiation and long-range electrons are released through ionization by higher energy radiation of said broadband radiation, and the distance between the first cathode and the first anode is arranged so as to be shorter than the interaction length of the long-range electrons.

5. The detector as claimed in claim 4, wherein the distance between the first cathode and the first anode is arranged so as to be shorter a few times the interaction length of the short-range electrons.

6. The detector as claimed in claim 1, further comprising a gaseous avalanche amplifier for avalanche amplifying electrons created during ionization of said ionizable gas.

7. The detector as claimed in claim 1, further comprising an amplifier for amplifying the electrons created during ionization of said semiconducting material.

8. The detector as claimed in claim 1, wherein said second cathode and said second anode are arranged such that said part of said radiation can enter said solid state slab between said second cathode and said second anode.

9. The detector as claimed in claim 1, wherein said second cathode and said second anode are arranged such that said part of said radiation can enter said solid state slab through said second cathode and substantially perpendicular to said second cathode and said second anode.

10. The detector as claimed in claim 1, wherein the radiation entrance is arranged such that a planar radiation beam can enter the space, and the read-out arrangement is arranged such that electrons derivable mainly from ionization by transversely separated portions of said planar radiation beam are separately detectable.

11. The detector as claimed in claim 1, wherein the first cathode and the first anode are substantially parallel with each other and wherein the second cathode and the second anode are substantially parallel with each other.

12. The detector as claimed in claim 1, wherein the first cathode and the first anode are substantially non-parallel with each other and wherein the second cathode and the second anode are substantially non-parallel with each other.

13. A device for use in planar beam radiography, said device comprising:
   an X-ray source;
   means for forming an essentially planar X-ray beam located between said X-ray source and an object to be imaged; and
   the detector as claimed in claim 1 located and arranged for detection of the planar X-ray beam as transmitted through or reflected off said object.

14. The device as claimed in claim 13, further comprising:
   a second detector as claimed in claim 1, where the detectors are stacked to form a detector unit; and means for forming an essentially planar X-ray beam for each detector, said means being located between said X-ray source and said object, wherein each detector is located and arranged for detection of the respective planar X-ray beam as transmitted through or reflected off said object.

15. A detector for detection of ionizing radiation comprising a first detector section, which includes:

a first cathode and a first anode between which a first voltage is applicable;

a space capable of being filled with an ionizable gas and arranged at least partly between said first cathode and said first anode;

a radiation entrance arranged such that ionizing radiation can enter said space between said first cathode and said first anode, for ionizing the ionizable gas;

a read-out arrangement, wherein said first voltage is applicable for drifting electrons created during ionization of said ionizable gas towards the first anode, and said read-out arrangement is arranged for detection of the electrons drifted towards the first anode; and a second detector section, which includes:

a second cathode and a second anode between which a second voltage is applicable;

a solid state slab of an ionizable semiconducting material and arranged between said second cathode and said second anode; and a second radiation entrance arranged such that radiation can be entered into said solid state slab for ionizing the ionizable semiconducting material, wherein said second voltage is applicable for drifting electrons and holes created during ionization of said semiconducting material towards the second anode and cathode, respectively, and said read-out arrangement is further arranged for detection of the electrons and/or holes drifted towards the second anode and/or cathode, respectively, separately of the detection of the electrons drifted towards the first anode.

16. The detector as claimed in claim 15, wherein the first cathode, the first anode, the space capable of being filled with an ionizable gas, and the read-out arrangement are arranged for detection of radiation of a first energy or energy range, and wherein the second cathode, the second anode, the solid state slab of an ionizable semiconducting material, and the read-out arrangement are arranged for detection of radiation of a second energy or energy range, said second energy or energy range being higher than said first energy or energy range.

17. The detector as claimed in claim 15, wherein the first and second cathodes are constituted by a single conducting sheet or layer.

18. The detector as claimed in claim 15, wherein the first cathode and the first anode are substantially non-parallel with each other and wherein the second cathode and the second anode are substantially non-parallel with each other.

19. A method for detection of ionizing radiation in a detector comprising first and second detector sections comprising the steps of:

entering ionizing radiation into a space of said first detector section, said space being filled with an ionizable gas and arranged at least partly between a first cathode and a first anode;

ionizing the ionizable gas by means of said radiation;

applying a first voltage between said first cathode and first anode for drifting electrons created during ionization of said ionizable gas towards the first anode;

detecting the electrons drifted towards the first anode by means of a read-out arrangement;

entering radiation into a solid state slab of said second detector section, said slab being of an ionizable semiconducting material and arranged between a second cathode and a second anode;

ionizing the ionizable semiconducting material by means of said radiation entered into said solid state slab;

applying a second voltage between said second cathode and second anode for drifting electrons created during ionization of said semiconducting material towards the second anode; and detecting the electrons drifted towards the second anode separately of the detection of the electrons drifted towards the first anode by means of said read-out arrangement.

20. The method as claimed in claim 19, wherein radiation of a first energy or energy range is entered into the space filled with an ionizable gas; and radiation of a second energy or energy range is entered into the solid state slab of an ionizable semiconducting material, said second energy or energy range being higher than said first energy or energy range.

21. The method as claimed in claim 19, wherein the radiation entered into said solid state slab of an ionizable semiconducting material is identical with the part of the radiation entered into the space filled with an ionizable gas, which is transmitted through said space.

22. The method as claimed in claim 21, wherein radiation having a broadband energy spectrum is entered into the space, a substantial portion of the lower energy radiation of said broadband radiation is absorbed by the ionizable gas; and a substantial portion of the higher energy radiation of said broadband radiation is absorbed by the ionizable semiconducting material, whereby the detection is energy-resolved.

23. A detector for detection of ionizing radiation comprising:

a cathode and an anode between which a voltage is applicable;

a space capable of being filled with an ionizable gas and arranged at least partly between said cathode and said anode;

a radiation entrance arranged such that ionizing radiation can enter said space between said cathode and said anode, for ionizing the ionizable gas; and a read-out arrangement, wherein said voltage is applicable for drifting electrons created during ionization of said ionizable gas towards the anode, and said read-out arrangement is arranged for detection of the electrons drifted towards the anode;

a scintillating material arranged such that part of said radiation entered into said space through said radiation entrance can propagate through said space, can enter said scintillating material and be converted into light therein; and a light detecting arrangement for detection of said light.

24. The detector as claimed in claim 23, wherein the radiation entrance is arranged such that radiation having a broadband energy spectrum can enter the space, and wherein the detector further is arranged such that a substantial portion of the lower energy radiation of said broadband radiation is absorbed by the ionizable gas and a substantial portion of the higher energy radiation of said broadband radiation is converted into light in said scintillating material, whereby the detector provides for energy-resolved detection of the radiation.

25. The detector as claimed in claim 23, further comprising a gaseous avalanche amplifier for avalanche amplifying electrons created during ionization of said ionizable gas.

26. The detector as claimed in claim 23, wherein said scintillating material comprises a plurality of elongated scintillator elements arranged in an array.

27. The detector as claimed in claim 26, wherein said plurality of elongated scintillator elements are arranged such that said part of said radiation entered into said scintillating material will enter said plurality of elongated scintillator elements at a respective first end thereof, and wherein said light detecting arrangement is arranged at a respective second end thereof.

28. The detector as claimed in claim 26, further comprising interstitial barriers disposed between the scintillator elements so as to separate each scintillator element from adjoining elements, said interstitial barriers being comprised of a material that absorbs said part of said radiation entered into said scintillating material.

29. The detector as claimed in claim 23, wherein the radiation entrance is arranged such that a planar radiation beam can enter the space, and both the read-out arrangement and the light detecting arrangement are arranged such that electrons derivable mainly from ionization by transversely separated portions of said planar radiation beam are separately detectable.

30. A device for use in planar beam radiography, said device comprising:
   an X-ray source;
   means for forming an essentially planar X-ray beam located between said X-ray source and an object to be imaged; and
   the detector as claimed in claim 23 located and arranged for detection of the planar X-ray beam as transmitted through or reflected off said object.

31. A detector for detection of ionizing radiation comprising a first detector section, which includes:
   a cathode and an anode between which a voltage is applicable;
   a space capable of being filled with an ionizable gas and arranged at least partly between said cathode and said anode;
   a radiation entrance arranged such that ionizing radiation can enter said space between said cathode and said anode, for ionizing the ionizable gas;
   a read-out arrangement, wherein said voltage is applicable for drifting electrons created during ionization of said ionizable gas towards the anode, said read-out arrangement is arranged for detection of the electrons drifted towards the anode; and
   a second detector section, which includes:
   a scintillating material;
   a radiation entrance arranged such that radiation can be entered into said scintillating material and be converted into light therein; and
   a light detecting arrangement for detection of said light.

32. The detector as claimed in claim 31, wherein the cathode, the anode, the space capable of being filled with an ionizable gas, and the read-out arrangement are arranged for detection of radiation of a first energy or energy range, and wherein the scintillating material and the light detecting arrangement are arranged for detection of radiation of a second energy or energy range, said second energy or energy range being higher than said first energy or energy range.

33. A method for detection of ionizing radiation in a detector comprising first and second detector sections, said method comprising the steps of:
   entering ionizing radiation into a space of said first detector section, said space being filled with an ionizable gas and arranged at least partly between a cathode and an anode;
   ionizing the ionizable gas by means of said radiation;
   applying a voltage between said cathode and anode for drifting electrons created during ionization of said ionizable gas towards the anode;
   detecting the electrons drifted towards the anode by means of a read-out arrangement;
   entering radiation into a scintillating material of said second detector section;
   converting said radiation entered into said scintillating material into light; and
   detecting said light.

34. The method as claimed in claim 33, wherein
   radiation of a first energy or energy range is entered into the space filled with an ionizable gas; and
   radiation of a second energy or energy range is entered into the scintillating material, said second energy or energy range being higher than said first energy or energy range.

35. The method as claimed in claim 33, wherein the radiation entered into said scintillating material is identical with the part of the radiation entered into the space filled with an ionizable gas, which is transmitted through said space.

36. The method as claimed in claim 35, wherein
   radiation having a broadband energy spectrum is entered into the space;
   a substantial portion of the lower energy radiation of said broadband radiation is absorbed by the ionizable gas; and
   a substantial portion of the higher energy radiation of said broadband radiation is converted into light in said scintillating material.

* * * * *